United States Patent [19]

Shinozaki

[11] Patent Number: 4,781,823

[45] Date of Patent: Nov. 1, 1988

[54] PRE-FILTERING APPARATUS FOR USE IN CONTINUOUS PRESS

[75] Inventor: Mitsuo Shinozaki, Tokyo, Japan

[73] Assignee: Fukoku Kogyo Company Limited, Tokyo, Japan

[21] Appl. No.: 37,940

[22] Filed: Apr. 13, 1987

[51] Int. Cl.[4] .................... B01D 33/00; B30B 15/30
[52] U.S. Cl. ........................... 210/86; 210/97; 210/354; 210/359; 100/117; 100/138
[58] Field of Search ................ 210/97, 104, 106, 107, 210/86, 297, 354, 359, 433.1, 744, 241; 162/258, 259, 262, 246, 18, 52, 56; 100/45, 117, 145–150, 137, 138

[56] References Cited

U.S. PATENT DOCUMENTS

| | | | |
|---|---|---|---|
| 1,346,898 | 7/1920 | Kingsbury | 137/392 |
| 1,863,992 | 6/1932 | Nilsson | 210/297 |
| 3,040,898 | 6/1962 | Simmons | 210/359 |
| 3,452,876 | 7/1969 | Ginaven | 210/433.1 |
| 4,582,568 | 4/1986 | Iyengar | 210/104 |
| 4,592,275 | 6/1986 | Frankl | 210/433.1 |

FOREIGN PATENT DOCUMENTS 126525 9/1980 Japan .................................. 100/117

Primary Examiner—Richard V. Fisher
Assistant Examiner—Linda S. Evans
Attorney, Agent, or Firm—Russell, Georges & Breneman

[57] ABSTRACT

A pre-filtering apparatus for pre-filtering raw material to be pressed by a continuous screw press having a hopper includes a filtering screen arranged rotatably within the hopper about a shaft, so that the inside space of the hopper is divided into two portions. The raw material is supplied into the one of the two portions which communicates with the continuous screw press. Water, oils and fats extracted by the screen from the raw material are discharged out of the hopper through an outlet pipe provided to the hopper at a position above the shaft.

7 Claims, 2 Drawing Sheets

PRE-FILTERING APPARATUS FOR USE IN CONTINUOUS PRESS

BACKGROUND OF THE INVENTION

1. Field of the Invention

This invention relates to a pre-filtering apparatus for effecting a preliminary filtering for use in conjunction with a continuous press.

2. Description of the Related Art

Such an apparatus is used to filter water, oils and fats out of raw materials to a certain extent prior to the filtering operation by means of the continuous press. By effecting the pre-filtering, pre-pressed materials having a substantially constant liquid concentration can be introduced into the continuous press so that the high filtering efficiency can be attained.

In order to continuously press water, oils and fats out of raw materials such as paper pulp, bony parts, guts and sludges, there has been widely used a continuous press of a screw press type. In general, the continuous screw press comprises a screw shaft arranged rotatably, a screw drum arranged around said screw shaft to rotate therewith, a screw blade arranged helically around the outer surface of said screw drum, an outer drum arranged around said screw blade and having a number of small filtering holes formed therein, an inlet provided at one end of said outer drum and an outlet provided at the other end of said outer drum, whereby raw materials to be pressed are introduced through said inlet into a space between said screw drum, screw blade and outer drum, said space being gradually made smaller in a direction from said inlet to said outlet.

In case of effecting the filtering operation with the aid of such a screw press, when the raw material has a substantially constant liquid concentration, the filtering can be carried out efficiently. However, when the water concentration of the raw material is varied during the operation, the filtering efficiency might be decreased. Therefore, when the raw material has a varying liquid concentration, it is preferable to effect a preliminary filtering for the raw material prior to the introduction of the raw material into the screw press so as to make the liquid concentration of the raw material as constant as possible. Heretofore, in order to suppress the variation of the liquid concentration of the raw material, there has been used a rotating sieve, a drum screen and the like separately from the screw press. However, such known pre-filtering apparatuses are large in size and a large space is required for installing the pre-filtering apparatus. Further, the cost of the installation and the running cost become extremely high. Moreover, the maintenance of the known pre-filtering apparatus requires a high cost and much labor work.

SUMMARY OF THE INVENTION

The present invention has for its object to provide a novel and useful apparatus for effecting the preliminary filtering, said apparatus being simple in construction and cheap in cost and being able to supply to the continuous press raw materials having a substantially constant liquid concentration.

It is another object of the invention to provide a pre-filtering apparatus which is small in size and can be installed in a hopper provided at the inlet of the continuous press.

According to the invention a pre-filtering apparatus for use in a continuous press having a hopper through which raw material to be pressed is supplied to the continuous press comprises:

a plate-like filtering screen arranged within said hopper for dividing a space in the hopper into two portions, said filtering screen having a number of filtering holes formed therein;

a shaft for supporting one end of the filtering screen rotatably;

a stopper arranged in the hopper to limit the rotation of the filtering screen;

an inlet communicated with one of the space portions which is communicated with the continuous press; and an outlet communicated with the other space portion of the hopper, said outlet being provided above said shaft.

DESCRIPTION OF THE PREFERRED EMBODIMENT

Figure 1:
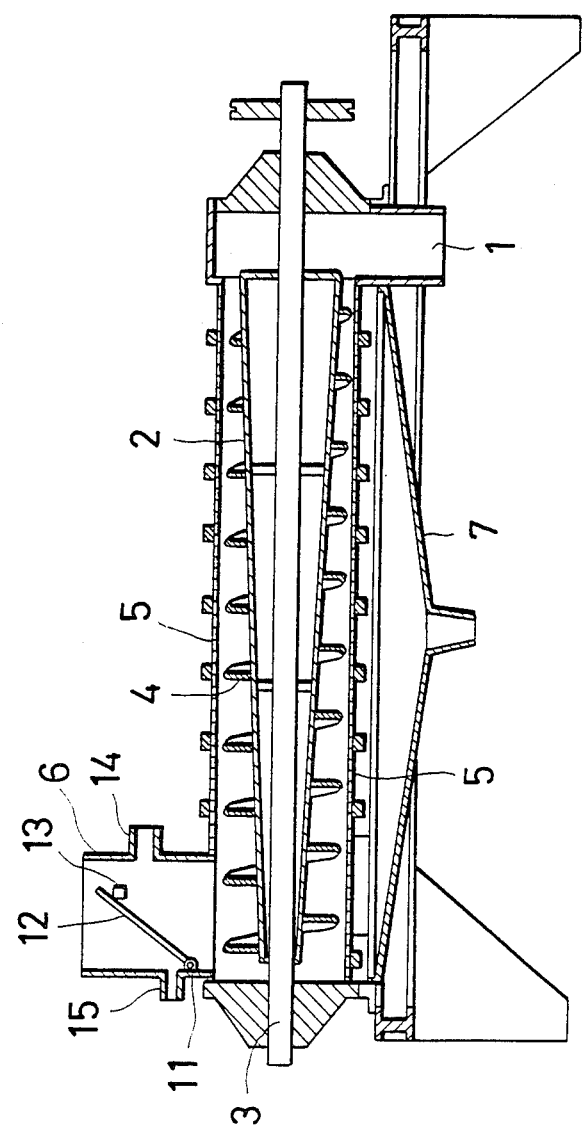
FIG. 1 is a cross sectional view showing a continuous screw press having a hopper in which the pre-filtering apparatus according to the invention is provided.

FIG. 1 is a cross sectional view showing a continuous screw press including a hopper having an embodiment of the pre-filtering apparatus according to the invention installed therein. The screw press comprises a screw shaft 3 arranged rotatably, a screw drum 2 secured to the screw shaft 3, a screw blade 4 arranged around the screw drum 2 helically and an outer drum 5. The diameter of the screw drum 2 is gradually increased from an inlet to an outlet 1 of the outer drum 5. Therefore, a space defined by the screw drum 2, screw blade 4, and outer drum 5 is gradually decreased toward the outlet 1 and raw materials are pressed to a gradually increasing extent. Water, oils and fats extracted from the raw materials are passed through small holes formed in the outer drum 5 and are discharged via a sink plate 7. The raw materials are injected into the inlet of the outer drum 5 through a hopper 6 and the pressed materials are discharged from the outlet 1 of the outer drum 5.

Figure 2:
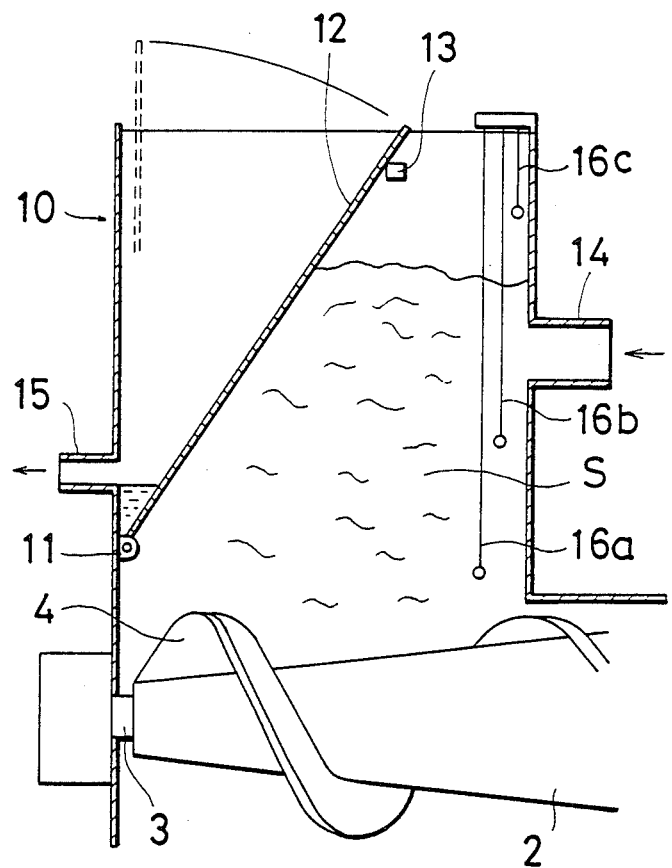
FIG. 2 is a cross sectional view illustrating a detailed construction of the pre-filtering apparatus shown in FIG. 1.

The pre-filtering apparatus 10 according to the invention is provided in the hopper 6 as clearly shown in FIG. 2. The pre-filtering apparatus 10 comprises a plate-like screen 12 arranged freely and rotatably about a shaft 11. The screen 12 is formed by an iron plate having a thickness of 1 to 2 mm in which a number of small holes having a diameter of 2 to 6 mm are formed by a drill. The free rotation of the screen 12 is limited by a stopper 13 secured on an inner surface of the hopper 6. The maximum rotation angle is preferably set to 20 to 45 degrees. A space within the hopper 6 is divided by the screen 12 into two portions. A raw material inlet pipe 14 is provided in the space portion communicating with the screw drum 2 and a liquid drain pipe 15 is provided in the other space portion. It should be noted that the liquid drain pipe 15 is provided above the shaft 11. Within the hopper 6 there are arranged three electrodes 16a, 16b and 16c. The lowermost electrode 16a is connected to the ground and the middle and uppermost electrodes 16b and 16c are connected to a suitable potential. By measuring electric resistance values across the electrode 16a and the electrodes 16b and 16c, respectively, it is possible to detect the level of the raw material in the hopper 6. An amount of the raw material introduced into the hopper 6 via the inlet pipe 14 is controlled in accordance with the detected level of the raw material in the hopper 6.

The raw material S introduced in the hopper 6 is first pressed by the screen 12 and extracted water, oils and fats are discharged out of the hopper 6 through the outlet pipe 15, when a level of the extracted liquid rises above the level of the outlet pipe 15. When an amount of the raw material S introduced in the hopper 6 is small, the screen 12 weighs against the stopper 13 and the liquid is extracted from the material and is discharged out of the hopper 6 via the outlet pipe 15. When the level of the raw material S is decreased lower than the middle electrode 16b, new raw material S is supplied into the hopper 6 via the inlet pipe 14. Then the screen 12 is pushed by the introduced raw material S and is rotated away from the stopper 13. When the raw material S has been introduced into the hopper 6 at such a level that the uppermost electrode 16c detects the raw material S, the screen 12 rotates into a substantially vertical position. A pressure applied to the screen 12 is gradually decreased in accordance with the increase of an amount of the raw material S in the hopper 6, so that the screen 12 is effectively prevented from being clogged with the raw material. Due to the weight of the screen 12, the raw material S is compressed and extracted liquid is discharged out of the hopper 6 through the outlet pipe 15. At the same time the pre-pressed raw material is supplied into the screw press. Then the level of the raw material S is lower and the screen 12 is gradually rotated toward the stopper 13. During this free rotation of the screen 12, a part of the raw material S stuck to the screen 12 is removed therefrom. When the level of the raw material S reaches the level of the middle electrode 16b, new raw material is supplied again into the hopper 6. At this time, no raw material S is stuck to the screen 12, so that the filtering function of the screen 12 is very high and the raw material is pressed efficiently. In this manner, the raw material S is preliminarily pressed and its liquid concentration becomes substantially constant. Therefore, the efficiency of the continuous screw press is maintained high during the filtering operation of the screw press.

If it is assumed that the filtering screen 12 is fixed to the stopper 13, the filtering holes in the screen 12 might be clogged with the introduced raw material soon, so that the raw material is hardly pressed. Then the screen 12 might function as a partition and an inside volume of the hopper 6 would be decreased accordingly. Therefore, the time period during which the raw material S stays in the hopper 6 would become shorter and the pre-filtering function in the hopper 6 would be substantially lost. When the screen 12 might be extremely clogged with the raw material, the raw material can not be removed from the screen 12. Thus it would be necessary to provide a washing apparatus.

The present invention is not limited to the embodiment explained above, but many modifications and alterations may be conceived by those skilled in the art within the scope of the invention. For instance, in the above embodiment the screen 12 is rotatable freely, but there may be arranged a driving mechanism for rotating the filtering screen 12 in accordance with the level variation of the raw material. Further, the filtering screen 12 may be biased toward the stopper 13 by means of a coiled spring or a weight secured to one end of a wire whose other end is secured to the free end of the screen 12. Moreover, the raw material inlet pipe 14 may be provided at an upper position of the hopper 6 instead of the side wall of the hopper 6. In the above embodiment, the pre-filtering apparatus 10 according to the invention is provided in the hopper 6 of the continuous screw press, but the pre-filtering apparatus 10 may be arranged in a hopper 6 of any type of continuous press.

As explained above the pre-filtering apparatus 10 according to the invention comprises the filtering screen 12 arranged rotatably, so that water, oils and fats can be effectively filtered out of the raw material S. Therefore, it is possible to supply the raw material S having a substantially constant liquid concentration to the continuous press and the filtering efficiency of the continuous press can be maintained high. Further the pre-filtering apparatus 10 according to the invention can be installed within the hopper 6 of the continuous press, and thus no special space is required for the pre-filtering apparatus 10.

What is claimed is:

1. A pre-filtering apparatus for use in a continuous press, comprising:
   a hopper through which raw material to be pressed is supplied to the continuous press;
   a plate-like filtering screen arranged within said hopper for dividing a space in the hopper into two portions, said filtering screen having means defining a number of filtering holes therein;
   a shaft means for journalling one end of the filtering screen thereto in a freely rotatable manner so that the raw material is pressed by the weight of the filtering screen;
   a stopper arranged in the hopper to limit the rotation of the filtering screen;
   an inlet means for communicating with one of the space portions which is communicated with the continuous press; and
   an outlet means for communicating with the other space portion of the hopper, said outlet means being provided above said shaft means.

2. An apparatus according to claim 1, wherein said stopper is arranged such that the filtering screen is limited to rotation to an angle of 20 to 45 degrees.

3. An apparatus according to claim 1, wherein said filtering screen is formed by an iron plate having a thickness of 1 to 2 mm.

4. An apparatus according to claim 3, wherein each of said filtering holes has a diameter of 2 to 6 mm.

5. An apparatus according to claim 1, further comprising means for detecting a level of the raw material in the hopper.

6. An apparatus according to claim 5, wherein said level detecting means comprises three electrodes arranged in the hopper at different levels.

7. An apparatus according to claim 6, wherein:
   a lowermost of said three electrodes is connected to ground and a middle and an uppermost of said three electrodes are connected to a potential so that, by measuring electric resistance values across the lowermost electrode and the middle and the uppermost electrodes, respectively, it is possible to detect the level of raw material in the hopper.

* * * * *